Dec. 9, 1958   W. J. MORRIS   2,863,817
REACTOR COOLANT TUBE SEAL
Filed Nov. 16, 1956
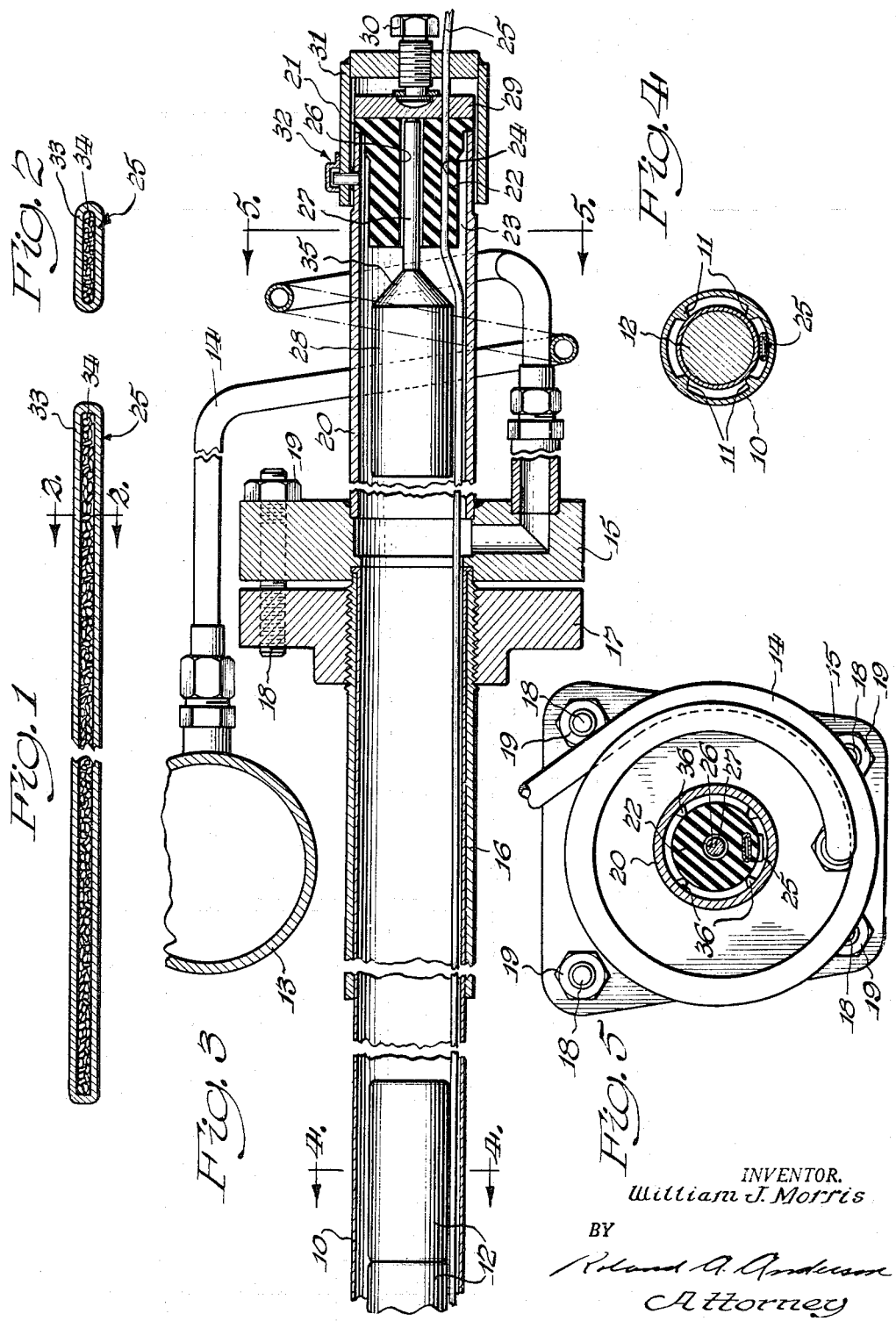
INVENTOR.
William J. Morris
BY
Roland A. Anderson
Attorney

2,863,817

REACTOR COOLANT TUBE SEAL

William J. Morris, Richland, Wash., assignor to the United States of America as represented by the United States Atomic Energy Commission Application November 16, 1956, Serial No. 622,719

4 Claims. (Cl. 204—193.2)

This invention relates to a fluid seal. More specifically, it relates to a seal and to a control element movable through the seal into and out of a liquid-containing region of a neutronic reactor.

In reactors of the type shown in Figs. 37, 38, and 39 of Fermi et al. Patent 2,708,656, dated May 17, 1956, involving graphite moderator, coolant tubes extending through the moderator, and fuel slugs positioned in the tubes with spaces between the slugs and tubes for coolant to flow, it may be desirable to insert control elements directly into the tubes.

The problem here is to provide a seal through which the control element enters the coolant tube, because the seal must be capable of permitting the control element to move in and out of the coolant tube without interference with the sealing functon. I have solved this problem by a special design of control element and seal.

In the drawings:

Fig. 1 is a longitudinal sectional view of a control element forming part of the present invention;

Fig. 2 is a transverse sectional view of the control element taken on the line 2—2 of Fig. 1;

Fig. 3 is a longitudinal sectional view of a coolant tube of a reactor, showing the control element and seal of the present invention applied to the coolant tube;

Fig. 4 is a transverse sectional view taken on the line 4—4 of Fig. 3 and showing how the control element fits between a fuel element and a coolant tube; and Fig. 5 is a transverse sectional view taken on the line 5—5 of Fig. 3 and showing the control element going through the seal.

As shown on Figs. 3 and 5, an horizontal aluminum coolant tube 10 is provided with a plurality of internal longitudinal ribs 11, upon which are positioned in end-to-end relation of plurality of aluminum-jacketed fuel elements 12 containing natural uranium, so that a space is provided between the fuel elements 12 and the interior of the coolant tube 10 on which space a coolant such as light water is flowed.

The coolant is supplied from a header 13 through a pipe 14 and a fitting 15, which is applied to one end of the coolant tube 10 by a tube 16, a flange 17, and bolts 18. The tube 16 mounts the portion of the coolant tube 10 adjacent said one end; the flange 17 is threaded on the tube 16; and the bolts 18 have threaded connections with the flange 17, pass through the fitting 15, and carry nuts 19 which are screwed tight against the fitting 15.

The portion of the coolant tube 10 beyond the tube 16 extends through and is supported by a graphite moderator, not shown. The tube 16 extends through a thermal shield, not shown that may be formed of cast iron and through a biological shield, not shown, that may be formed of alternate layers of graphite and steel.

To the fitting 15 one end of a tubular section 20 is connected in a soldered or welded joint. The other end of the tubular section 20 is closed by a circumferential flange 21 formed on one end of a novel seal 22 of the present invention. The seal 22 is formed of a resilient material such as natural rubber, neoprene, or vinyl polychloride. The seal 22 is generally round and cylindrical and has, except at the flange 21, an outer diameter less than the interior diameter of the tubular section 20, so that there is an annular space 23 formed between the seal 22 and the tubular section 20. The seal 22 has a thin wide longitudinal slot or opening 24 which tightly fits a flexible control element 25, and a central longitudinal opening 26 which loosely receives a rod-like extension 27 formed on a lead shielding slug 28.

The flange 21 of the seal 22 is firmly clamped against the end of the tubular section 20 by an end piece 29, to which pressure is applied by a screw 30 rotatably seated in the end piece 29 and a cap 31 through which the screw 30 is threaded. The cap 31 has a bayonet-type connection 32 with the tubular section 20.

The tube 16, flange 17, fitting 15, pipe 14, header 13, tubular section 20, end piece 29, screw 30, and cap 31 may be formed of stainless steel. A similar arrangement of these parts, not shown, is to be provided at the outlet end of the coolant tube 10 except that at the outlet end the end piece 29 and cap 31 will contain no openings for the control element 25, and there will be no seal 22. Also, at the outlet end lead shielding slugs generally like the shielding slug 28 but without the rod-like extension 27, and also perhaps hollow aluminum spacing slugs, will be provided between the last fuel element 12 and the end piece 29, because the flow of coolant water through the coolant tube 10 toward the outlet end tends to push the fuel elements 12 out the outlet end.

As shown in Figs. 1 and 2, the control element 25 comprises a flattened aluminum tube 33 and a filling 34 of neutron-absorbing material such as boron carbide or amorphous boron. The control element 25, being wide and thin as shown, is flexible in one direction transverse to its length, so that, when it is inserted through the seal 22, the control element is easily deflected by contact of is end with a conical surface 35 on the shielding slug 28 into the space between the shielding slug and the interior of the tubular section 20. This space exists, because the shielding slug 28 rests on internal longitudinal ribs 36 of the tubular section 20, shown in Fig. 5. Continued insertion of the control element 25 brings it into the space between the fuel elements 12 and the interior of the coolant tube 10, as shown in Figs. 4 and 5. This space exists, because, as previously stated the fuel elements 12 rest on the internal ribs 11 of the coolant tube 10.

Because the control element 25 is wide and thin, the opening 24 therefor in the seal 22 is wide and thin, and because of the latter fact, the pressure of the coolant, acting in the annular space 23 about the seal 22, can and does make the walls of the opening 24 of the seal 22 tightly engage the control element 25, so that a good sealing action is obtained. When the control element 25 is withdrawn from the seal 22, the opening 24 is closed by collapse, although it is not necessary to withdraw the control element 25 completely from the seal 22 to minimize the neutron absorption by the control element 25. Incidentally, the coolant flows through the coolant tube 10 to the left of the fitting 15 as viewed in Fig. 3 and is stagnant to the right of the fitting 15 as viewed in Fig. 3 where the seal 22 is located.

Insertion of the control element 25 through the seal 22 is greatly facilitated by the application of a water-soluble oil to the control element, which oil lubricates the seal. When the control element 25 is being withdrawn, the water on the control element provides sufficient lubrication.

The control element 25 may be made by filling an aluminum tube of 5/16" outer diameter and a .014" wall thickness with boron carbide and rolling the tube first to a .075" thickness and then to about a .055" thickness. A grain size of 30 to 60 mesh for the boron carbide facilitates filling of the aluminum tube with the boron carbide. The final thickness of the boron carbide in the flattened tube is about .025". The hole 24 in the seal 22 which receives the control element 25 may be .450" wide and .075" thick.

Reference is made to Figs. 37–39 of Fermi et al. Patent 2,708,656, dated May 17, 1955, and to Wigner et al. application Serial No. 622,630 filed October 16, 1945, for a complete disclosure of the type of neutronic reactor to which the present invention is applied. It will be understood that the control element 25 is not applied to each set of coolant tube 10 and fuel elements 12 of the reactor, but to one or more of such sets as the need may be. The use of the control element 25 of the present invention is helpful in relieving local hot spots in the reactor.

The intention is to limit the invention only within the scope of the appended claims.

What is claimed is:

1. The combination with a coolant tube having internal longitudinal ribs, and end member fastened to the coolant tube, and a plurality of jacketed nuclear-fuel elements positioned within the coolant tube to rest on the ribs thereof; of a flexible control element formed of a flattened tube and a neutron-absorbing filling therein and extending between the fuel elements and the coolant tube and a seal of resilient material having a longitudinal slot tightly receiving the control element, the seal being held by the end member so as to extend within the end of the coolant tube in spaced relation to the interior thereof, whereby the coolant around the seal collapses the slot to prevent escape of coolant from the coolant tube when the control element is withdrawn from the seal.

2. The combination specified in claim 1, the control element being formed of a flattened aluminum tube and having a filling of a substance of the group consisting of boron carbide and amorphous boron.

3. The combination with a coolant tube, and a plurality of nuclear-fuel elements laid end to end in the coolant tube; of a wide thin flexible control element containing neutron-absorbing material and extending between the fuel elements and the coolant tube, and a seal of flexible material fastened in one end of the coolant tube and having a longitudinal slot tightly receiving the control element, the seal extending within one end of the coolant tube in space relation to the interior thereof, whereby the coolant around the seal collapses the slot to prevent escape of coolant from the coolant tube when the control element is withdrawn from the seal.

4. In combination, an aluminum coolant tube having longitudinal internal ribs, a plurality of aluminum-jacketed fuel elements containing thermal-neutron-fissionable material and being laid end to end in the coolant tube on the ribs thereof, a shielding element positioned in one end of the tube and having a conical surface at its end away from the fuel elements and a rod-like extension beyond the conical surface, an end member fastened to the said one end of the coolant tube and being abutted by the rod-like extension, a flexible control element formed of a flattened aluminum tube and a filling of a substance of the group consisting of boron carbide and amorphous boron, the control element extending through the end member and between the fuel elements and the interior of the coolant tube, and a cylindrical seal of resilient material having a central opening loosely receiving the rod-like extension and a slot offset from the central opening and tightly receiving the control element, the seal being clamped by the end member to the said one end of the tube so as to extend within said one end of the tube in spaced relation to the interior thereof, whereby the coolant around the seal collapses the slot to prevent escape of coolant from the coolant tube when the control element is withdrawn from the seal, and the conical surface on the shielding plug facilitates lateral displacement of the control element from the slot in the seal to the space between fuel elements and th interior of the coolant tube.

References Cited in the file of this patent

UNITED STATES PATENTS

| 2,708,656 | Fermi et al. | May 17, 1955 |
| 2,781,308 | Creutz et al. | Feb. 12, 1957 |

OTHER REFERENCES

Research Reactors, TID 5275, Library, date Oct. 10, 1955, pp. 145, 180, 183, 184.

Proceedings of the International Conference on the Peaceful Uses of Atomic Energy, vol. 2, United Nations, N. Y. 1956, p. 452.